United States Patent [19]
Chun

[11] Patent Number: 5,232,016
[45] Date of Patent: Aug. 3, 1993

[54] VACUUM STORAGE CONTAINER

[76] Inventor: Tseng L. Chun, No. 161, Hsin Min Rd., San Min District, Kao Hsiung City, Taiwan

[21] Appl. No.: 955,349

[22] Filed: Sep. 30, 1992

[51] Int. Cl.$^5$ .............................................. E03B 5/00
[52] U.S. Cl. ......................... 137/565; 137/512.3; 137/533.21; 137/614.19; 220/202; 220/366; 251/148
[58] Field of Search ............... 137/512.3, 533.21, 855, 137/565, 614.19; 251/144, 148; 220/202, 366

[56] References Cited

U.S. PATENT DOCUMENTS

| | | | |
|---|---|---|---|
| 1,277,383 | 9/1918 | Cherry | 137/565 |
| 1,493,149 | 5/1924 | Crandall | 137/512.3 |
| 2,813,401 | 11/1957 | Smith | 137/512.3 |
| 3,070,089 | 12/1962 | Dick | 137/855 |
| 3,633,613 | 1/1972 | Tulow | 137/512.3 |
| 4,290,446 | 9/1981 | Seiler | 137/565 |
| 4,862,918 | 9/1989 | Schroeder | 137/614.19 |
| 4,938,255 | 7/1990 | Lonfrio et al. | 137/565 |
| 5,121,590 | 6/1992 | Scanlon | 137/533.21 |

Primary Examiner—A. Michael Chambers
Attorney, Agent, or Firm—W. Wayne Liaugh

[57] ABSTRACT

A vacuum storage container, which comprises a container with a lid for sealing the container; the lid is mounted with a sucking valve, which is a check valve to have the air in the container pumped out only in one-way upon the container being closed hermetically; after the container being in vacuum or similar to a vacuum condition, a substance in the container can be stored for a long time without changing the quality thereof.

1 Claim, 2 Drawing Sheets

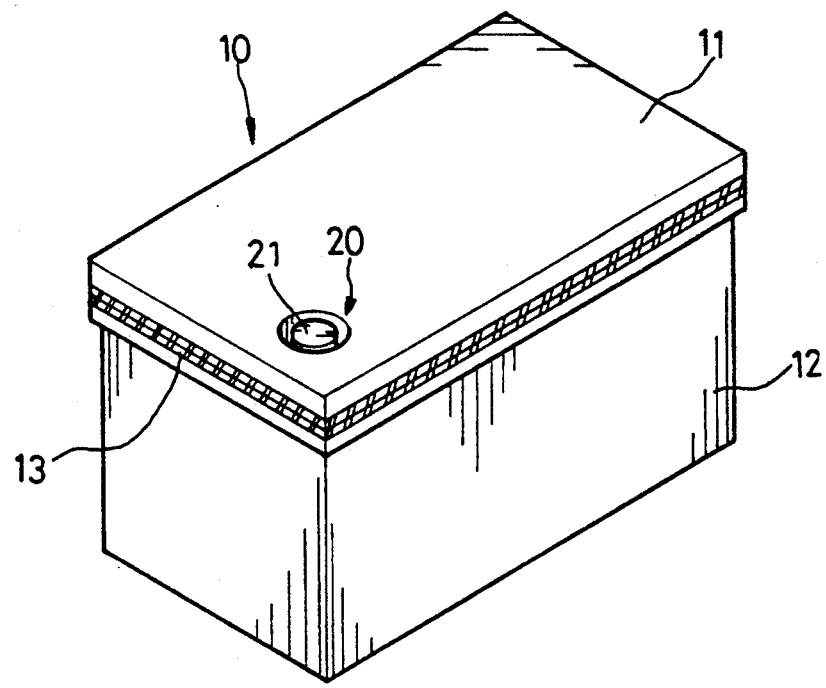
FIG. 1
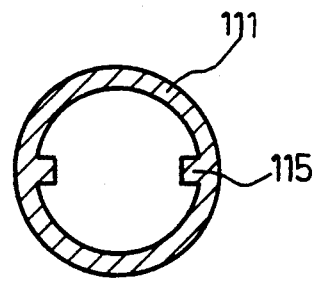
FIG. 3  A—A
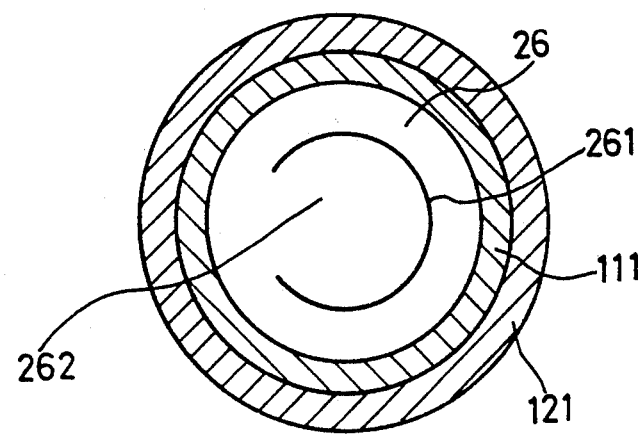
B—B
FIG. 4

VACUUM STORAGE CONTAINER

BACKGROUND OF THE INVENTION

The more the science is developed, the more the technique becomes precise; then, the requirements of inactivation and precision to a material or a product have become much higher than ever; otherwise, the quality of a product would be affected adversely. Therefore, our requirements to a container for some products, such as an optical instrument, a lens, or a material being sensitive to moisture or oxidation become more rigid than ever so as to prevent them from changes in function, quality and serviceable life; however, the current and ordinary containers can only provide a hermetic seal function, being unable to meet the requirements as mentioned above.

SUMMARY OF THE INVENTION

This invention relates to a vacuum storage container, which can easily and simply become an almost vacuum container by mounting a sucking valve in the lid of the container. The sucking valve can prevent air from entering the container, but the air therein can easily be pumped out completely to have the container become an almost vacuum condition for storage of product which is sensitive to moisture, fustiness, oxidation and deterioration so as to maintain the useful valve of the product.

BRIEF DESCRIPTION OF THE DRAWINGS

FIG. 1 is a perspective view of an embodiment according to the present invention;

FIG. 3 is a sectional view taken along line A—A in FIG. 2.

FIG. 4 is a sectional view taken along line B—B in FIG. 2.

DETAILED DESCRIPTION

Figure 2:
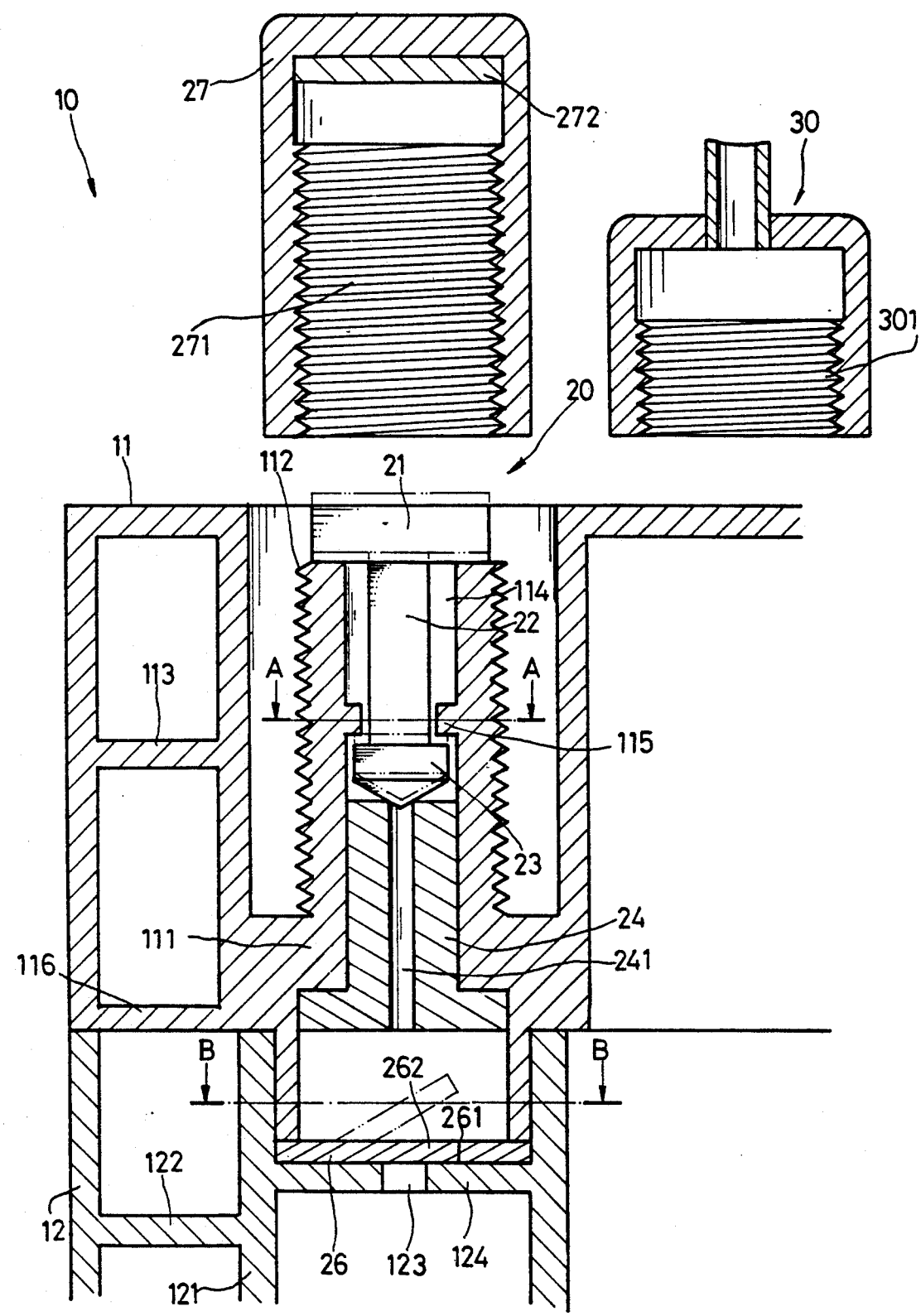
FIG. 2 is an enlarged sectional view of sucking valve in the present invention.

FIG. 1 is a perspective view of an embodiment according to the present invention, which comprises a container 10 being closed with a lid and a sucking valve 20. The container 10 includes a lid 11, a body portion 12 and a gasket 13 being mounted between the aforesaid two parts for airtight seal. (The airtight seal for the container is deemed a well-known technique, and therefore no details are given.) FIG. 2 is an enlarged sectional view of a sucking valve of the present invention; the sucking valve 20 is mounted in the lid 11 of the container 10, being sunk under the surface of the lid 11 to facilitate another container to be stacked above. The sucking valve 20 includes a metal block 21, a connecting member 22, a conic member 23, an exhausting hole cylinder 24, a valve assembly 26, and a sucking valve cap 27. The metal block 21 is similar to a disk member which is connected together with the conic member 23 through the connecting member 22; the bottom of the conic member is substantially a cone. The exhausting hole cylinder 24 has a slender upper portion and a lower portion with a larger diameter; an exhausting hole 241 is provided through the longitudinal core of the exhausting hole cylinder; the cylinder 24 is mounted in the center hole 114 of an outer cylinder 111. The center hole 114 is a through hole, in which two opposite lugs 115 are furnished on the inner wall thereof (as shown in FIG. 3). The lower section of the center hole 114 is inserted with the exhausting hole cylinder 24, which the upper section of the center hole 114 is inserted with the connecting member 22 and the conic member 23; the metal block 21 is retained on the top of the outer cylinder 111 so as to have the conic member 23 confined under the opposite lugs 115 and above the top of the exhausting hole cylinder 24 in a movable manner. The outer surface of the outer cylinder 111 has outer threads 112 so as to connect with a sucking valve cap 27 or a connector 30 (as shown in FIG. 2) of a vacuum pump (not shown). The edge part of the lid 11 is provided with horizontal partitions 113 and 116 for reinforcing and fixing the outer cylinder 111.

Below the outer cylinder 111 of the lid 11 and on the top of the body portion 12, a lower cylinder 121 is furnished; the lower cylinder 121 also has a horizontal partition 122 to reinforce the cylinder 121. The upper end of the lower cylinder 121 has a partition plate 124 with a small center hole 123, which is the only passage for the body portion 12 to be in communication with the outside of the body portion. The partition plate 124 is covered with a valve assembly 26, which includes a C-shaped slit 261 (as shown in FIG. 4), an valve plate 262 able to move up and down with a connected part at one side thereof as a fulcrum. When the lid 11 and the body portion 12 are in closed condition, the lower flat end part of the outer cylinder 111 will press over the valve assembly 26 to have the assembly 26 sat in a space between the outer cylinder 111 and the partition plate 124.

To operate the present invention, the user should have the lid 11 and the body portion 12 closed tightly to prevent air from flowing in and out; then, use the sucking valve 20 to pump air out of the container 10. As shown in FIG. 2, the connector 30 of a vacuum pump (not shown) is mounted around the outer cylinder 111 by using the inner threads 301 and the outer treads 112 to engage each other. When the vacuum pump is operating, the metal block 21 will be lifted upwards until the conic member 23 being stopped with the opposite lugs 115; in that case, the exhausting hole of the cylinder 24 will be opened, and the valve plate 262 of the valve assembly 26 will be lifted up as a result of the pumping force to have the small center hole 123 in the partition plate 124 opened; then, the air in the container 10 will be pumped out through the small center hole 123, the exhausting hole 241, the center hole 114 and the space under the metal block 21 until the air in the container 10 being exhausted completely and becoming a vacuum space. After the pumping operation is completed, remove the connector 30, and the conic member 23 and the valve plate 262 will return to their original and normal positions respectively as a result of losing pumping force, and will close the small center hole 123 and the exhausting hole 241 respectively to prevent air from flowing therein; then, the sucking valve cap 27 is screwed on the sucking valve 20 to seal the same by means of the inner threads 271 and the outer threads 112. The bottom of the sucking valve cap 27 is mounted with a gasket 272 to insure the airtight effect. Since the inside of the container 10 can be pumped to an absolute vacuum condition approximately, a substance stored therein will be prevented from having moisture, fustiness, being oxidized and deteriorated so as to maintain the useful quality of a substance.

I claim:

1. A vacuum storage container comprising a lid with a sucking valve, and a body portion; said sucking valve being mounted in said lid and being sunk under the surface of said lid; said sucking valve including a metal block, a connecting member, a conic member, an exhausting hole cylinder, a valve assembly and a sucking valve cap; said metal block and said conic member being connected together by means of said connecting member; said exhausting hole cylinder having an exhausting hole through the center thereof; said exhausting hole cylinder being mounted in the lower part of a center hole of said lid; said center hole having two opposite lugs; the lower part of said center hole being inserted with said exhausting hole cylinder, while the upper part of said center hole being inserted with said connecting member and said conic member so as to have said metal block rested on the top of said center hole, and to have said conic member set in a space under said opposite lugs and above the top of said exhausting hole cylinder so as to be able to move up and down; the outer surface of said outer cylinder being furnished with outer threads to be engaged with the threads of said sucking valve cap or a connector of a vacuum pump; said lid being furnished with horizontal partitions nearing the edge thereof for reinforcing said outer cylinder; the upper end of said body portion of said container being furnished with a lower cylinder being opposite to said outer cylinder which also having horizontal partitions for reinforcing purpose; one of said horizontal partition having a small center hole; said valve assembly having a C-shaped slit which enables said valve plate to move up and down; after said lid being closed to said body portion, a flat end part on the lower end of said outer cylinder pressing over said valve plate to confine said valve plate being the lower end of said outer cylinder and said partition plate; after the inner threads of said connector of said vacuum pump being engaged with the outer threads of said outer cylinder, said vacuum pump beginning to pump the air out of said container, and said metal block, being lifted up until said conic member being stopped with said opposite lugs; and then a space being left between the bottom of said conic member and said exhausting hole cylinder; said valve plate being sucked to move up to have said small center hole in said partition plate opened, and then the air in said container able to flow through said small center hole, said exhausting hole, and a space between said center hole and the bottom of said metal block, and finally to flow out of said container in one-way manner until all the air therein being pumped out to become a complete or similar to a vacuum condition.

* * * * *